United States Patent Office 3,502,972
Patented Mar. 24, 1970

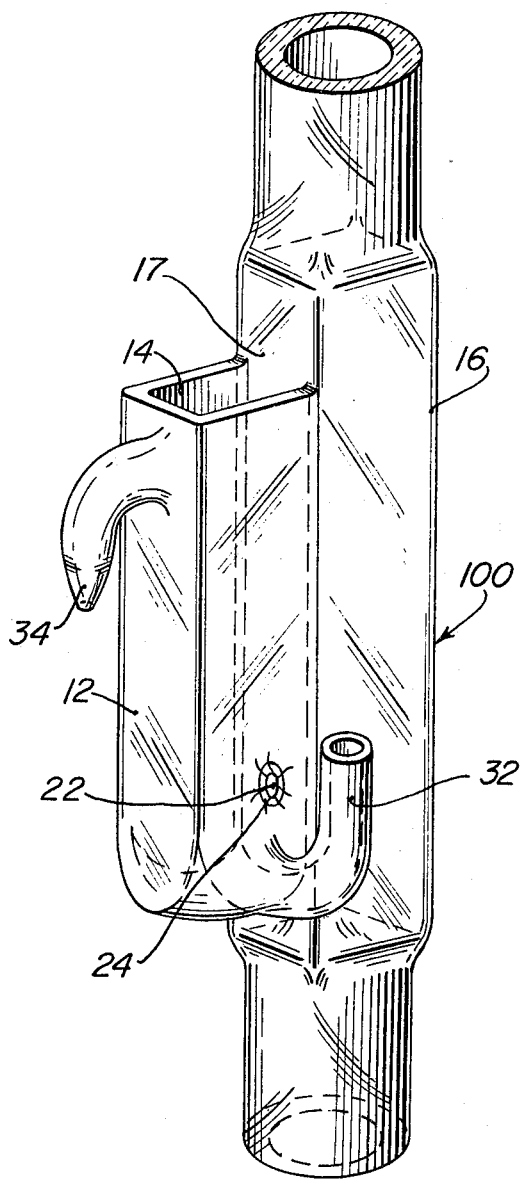
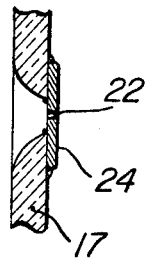

3,502,972
CONTINUOUS FLOW PARTICLE SIZE ANALYSER APPARATUS HAVING SUSPENSION LEVEL MAINTAINING MEANS
Robert H. Berg, 196 Clinton Ave., Elmhurst, Ill. 60126
Filed Mar. 8, 1965, Ser. No. 450,230
Int. Cl. G01n 27/00; F17d 1/00; E03b 11/00
U.S. Cl. 324—71                              8 Claims

ABSTRACT OF THE DISCLOSURE

A continuous flow particle measuring apparatus which has a duct, and a flow-through chamber formed around a microscopic passageway in the wall of the duct and connected thereto. Electrodes positioned in the duct and in the chamber are electrically coupled to a detecting device which drives a counter or other apparatus for measuring, sizing, or tabulating the particles passing through the microscopic passageway. Vacuum means are positioned at one end of the duct to maintain a suspension level in the duct sufficient to immerse the electrode therein and the passageway, yet insufficient for withdrawal of suspension from the duct. A conduit is coupled to the other end of the duct for withdrawal of the suspension. The conduit communicates with a reservoir which has drain means. The pressure drop, by reason of the difference in heights between the passageway and the level of suspension at the reservoir drain, causes the flow of suspension through the passageway.

---

This invention relates generally to particle study and analysis apparatus and more particularly is concerned with apparatus which may be associated with a continuous flow system so that particles carried by a continuous stream may be sampled continuously.

The basic particle analysis apparatus which utilizes the change in electrical impedance of a small volume of liquid occasioned by the passage of a particle through the volume of liquid is disclosed in Coulter Patent 2,656,508, and the principles there described and claimed are used in the apparatus of this invention. The most familiar version of apparatus embodying the Coulter Patent 2,656,508 is one in which a metered quantity of suspension consisting of particles suspended in an electrolyte is drawn through a microscopic aperture in a wall of insulating material. There is an electrode on opposite sides of the wall immersed in electrolyte, at least the upstream body of electrolyte having the particles it is desired to study. Each particle passing through the aperture causes a change in conductivity which is electrically sensed by the electrodes and associated circuitry and used to operate a detector which drives a counter or other apparatus for measuring, sizing, tabulating or control.

The said familiar apparatus has been of the batch type in which one body of liquid is held in a vessel and the second body of liquid is contained within a closed siphon system which includes an aperture tube dipping down into the first vessel. The aperture which has been mentioned is usually a microscopic hole which has been drilled or otherwise formed in a glass or jewel wafer which is secured in the side of the inner tube and immersed in the body of electrolyte in the outer vessel. The siphon system operates in accordance with the teachings of Coulter Patent 2,869,078, but such systems are characterized by provision for metering a given volume of liquid.

In many industrial processes, it is desired that there be a continuous measurement of particles suspended in continuously flowing liquids. In such instances, the number of particles in any given quantity of liquid is not as important as the distribution of particle size and hence particle volume. Specifically, the relative number of particles within any given range of size compared with the number within other given ranges of size is important information which does not require the metering of a given quantity of fluid. In any event, flow rate will usually be known, concentration may be known or computed, and if desired actual counts may be taken for timed periods of flow.

In such apparatus, the liquid flowing may be pre-diluted in accordance with a known dilution and the measurements made as sampling, albeit in a continuous process.

Since the Coulter apparatus produces a measurable change in the impedance of the effective volume of liquid which is within the aperture which is functionally related to the total volume of a given particle passing through the aperture, the Coulter apparatus is ideally suited for particulate studies.

Accordingly, it is one of the principal objects of the invention to provide apparatus which will take the place of the vessels and aperture of the Coulter apparatus described above for use in a continuous flow stream to enable the scanning of the stream or a portion thereof for the measurement of the size of the particles suspended therein, and if desired, counting the same.

Still another object of the invention is to provide apparatus of the character described which is simple in construction and reliable in operation.

Still a further object of the invention is to provide apparatus for measuring and providing a signal output related to the distribution of particles of different sizes in a continuous flow stream of liquid.

Many other objects will occur to those skilled in this art as a description of the invention proceeds hereinafter, in connection with which preferred embodiments are detailed and shown in the accompanying drawings in which:

FIG. 2 is a perspective view of a measurement cell constructed in accordance with the invention and showing a modified form thereof.

FIG. 3 is a fragmentary sectional view taken through the wafer and aperture of the structure of FIG. 2.

Figure 1:
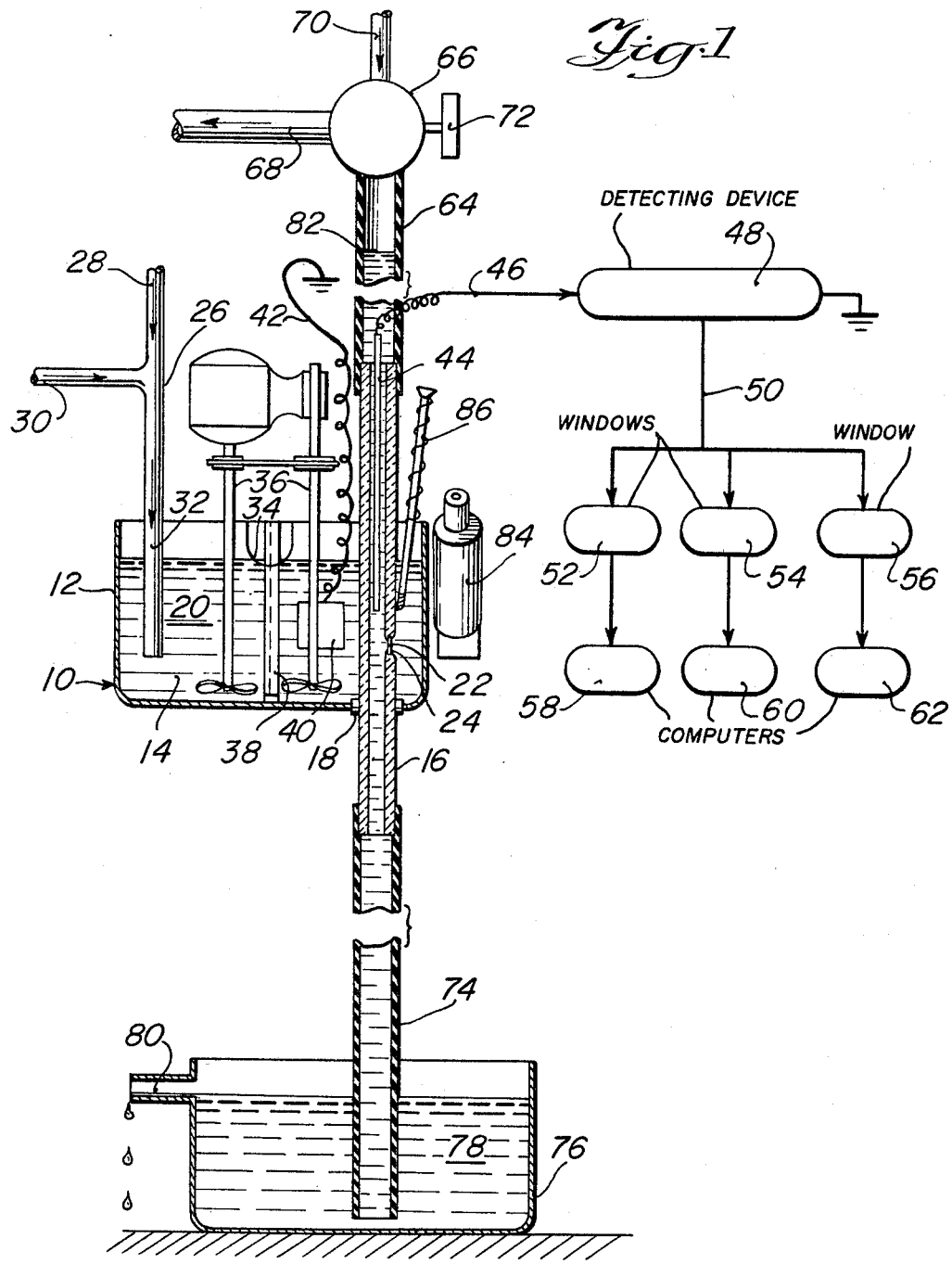
FIG. 1 is a diagrammatic representation of apparatus constructed in accordance with the invention.

Referring now to the drawings, the reference character 10 designates generally what may be termed a continuous flow cell. The same comprises a vessel 12 of insulating material which may be formed of two parts, for example, a flow-through part including the chamber 14 and a withdrawal part which in FIG. 1 comprises conduit or duct 16 connected with the vessel 12 at 18 in sealing engagement and having a liquid as well as electrically conductive connection with the suspension of particles designated 20 by means of an aperture indicated generally at 22. It will be appreciated that the aperture 22 preferably is formed in a wafer 24 which is secured in fluid-tight relationship in one of the walls of the conduit 16. The wafer 24 may be of sapphire or the like material.

At 26, there is illustrated a fitting or a pipe having two inlet branches, one at 28 and one at 30, both of these branches combining to provide a spud 32 that enters the vessel 12 preferably below the surface of the body of liquid 20 contained within the vessel. The sample stream is injected at 28 and suitable diluent or electrolyte is injected at 30. As previously noted, this may be all or a part of the stream being measured. The vessel may have an overflow at 34 so that there is a continuous flow within the same. Electrically driven mixers or agitators are shown at 36 and there may be a screen at 38 to prevent large debris and the like from entering into the portion of the vessel 12 through which the conduit 16 extends.

An electrode 40 is immersed in the body of fluid 20 and connected by the electrical lead 42 to one terminal of a detecting device. The second electrode 44 is disposed on the interior of the conduit 16 and is connected by an electrical lead 46 to the detecting device. In this instance the detecting device is shown at 48, and the output thereof may be transmitted by the channel 50 to discriminating devices in the form of a plurality of what may be termed windows such as known in the electronic art. The effect of such windows respectively is to accept pulses of limited size and by the use of a sufficient number of windows, the entire range of pulses and hence particles it is desired to study may be covered.

One form of electronic window which has been known is an electrical circuit in which there are two threshold voltage levels one above the other; an input circuit which converts incoming signals to voltage pulses whose amplitudes are respectively related to the size of the particles causing the initial signals by passage through the aperture; and an output circuit which will be energized only by a voltage pulse whose amplitude exceeds the bottom threshold voltage and is less than the upper threshold voltage. The threshold circuits are arranged to discriminate against all other signals. A plurality of such electronic windows is formed by simply adjusting the values of the threshold voltages of each window.

Such windows are designated generally 52, 54 and 56. Each window therefore will produce an output related to the number of particles occurring within a given range, and such output may be integrated or otherwise acted upon to provide either pulse rate or total or relative particle volume in each window or indicators or computers which are shown at 58, 60 and 62.

The upper end of the conduit 16 is connected by means of a hose 64 to a vacuum regulator 66 that in turn leads to a vacuum source by way of the conduit 68, has suitable bleeder inlet 70, and an adjustable valve the manual control of which is shown at 72. At the the bottom end of the conduit 16, there is another hose 74 which dips into a large vessel 76 that contains fluid 78 which drains off at 80, so there is always a barometric seal at the bottom of the entire system. Sufficient vacuum is drawn to maintain the liquid level above the aperture 22 for example, at 82. The electrode 44, of course must be immersed.

The purpose of the conduit 74 and the reservoir 76 is to establish a constant pressure drop across the aperture 22 by reason of the hydrostatic head due to the difference in heights between the aperture 22 and the drain 80, and to isolate the signal electrode 44 from ground electrically by means of the drain 80. The level 82 may be anywhere between the aperture 22 and the vacuum regulator 66 so long as contact is made between the suspension and the signal electrode 44. Since it is the pressure drop due to the difference in level between the aperture 22 and the drain 80 which causes the flow of sample suspension through the aperture, the vacuum regulator need only be accurate enough to maintain the surface 82 high enough to make contact to the electrode 44, but not so high that suepension is sucked into the regulator 66.

It will be obvious from the above that there will be a continuous flow of this fluid while there is a flow of the sample stream and diluent overflowing from the notch 34 and while the vacuum is adequately maintained.

The microscope 84 is arranged to enable the observer continuously to watch the aperture 22 to ascertain if there is a blockage, and if there is a blockage, some mechanical means such as shown at 86 may be used to clean the same.

Referring now to FIG. 2, there is illustrated a rather compact arrangement quite similar to that shown in FIG. 1. The cell in this case is designated 100. The chamber 14 is formed as a rectangular member 12 having an inlet pipe 32 and an overflow pipe 34, all being formed of glass as an integral unit. The vessel 12 is fused or secured to a vertical conduit 16, the upper and lower ends of which are suitable for connection with hoses such as shown at 64 and 74. A wafer 24 with aperture 22 is fused to the side wall 17 of the conduit 16, and this is shown in a large view in FIG. 3.

Examining the apparatus of FIGS. 2 and 3, it will be appreciated that this form of apparatus may be used in another manner, with the same object in view. The conduit 16 may be arranged to carry the continuous stream of electrolyte with particles and the flow of sample may therefore be from the interior of the conduit 16 outward through the aperture 22. The chamber 14 will thus have a volume of fluid therein, at least above the level of the aperture, and likewise there will be an electrode in this chamber as well as in the conduit 16. The inlet pipe 32 may be used for filling or draining the chamber 14. In use, the inlet pipe will be connected to provide a stand of liquid above the overflow pipe 34. The overflow pipe will produce discrete drops, normally, and these will prevent the inadvertent grounding of the electrode disposed in the chamber 14.

What it is desired to secure by Letters Patent of the United States is:

1. A continuous flow particle measuring apparatus which comprises, a duct having a wall at least a portion of which is of insulating material, a microscopic passageway in said wall portion of said duct, a flow-through chamber formed around said passageway on the exterior of the duct and connected to the duct, said duct extending through said flow-through chamber, the flow-through chamber adapted to have a source of continuously flowing suspension connected thereto, means for producing a pressure differential on opposite ends of the passageway to cause continuous flow of a portion of said suspension with particles through said passageway and out from said duct, electrodes in said chamber and duct, a source of electric current connected to said electrodes, and means coupled to said duct for maintaining a level of suspension within said duct to immerse said passageway and said electrode in the duct, yet insufficient for removing suspension from the duct.

2. A continuous flow structure for a particle measuring apparatus, said apparatus having a pair of vessels with an aperture between them, electrodes in each vessel, an electric current source connected to said electrodes, a detector connected to the electrodes for producing signals related to the size of particles passing through the aperture, circuitry providing a plurality of windows of different size range connected to respond to the detector output, computer means connected to the circuitry to convert the outputs of the respective windows ino relative particle distribution data; said continuous flow structure comprising: continuous flow input means coupling one of said vessels to a continuous source of suspension, means coupled to said vessels to control the flow of suspension through said aperture and out from the other of said vessels to be a small fractional portion of the total flow of suspension, and means coupled to the other of said pair of vessels for maintaining a level of suspension therein sufficient to immerse its electrode and the aperture, yet insufficient for removing suspension from said other vessel.

3. A continuous flow structure as defined in claim 2 wherein said means for maintaining a level of suspension within said other of said pair of vessels comprises: vacuum means coupled to one end of the other of said pair of vessels.

4. The continuous flow structure as defined in claim 2 wherein said control means comprises: a reservoir suitable for containing a volume of suspension, said reservoir having a drain adjacent its upper end, and a conduit, having one end coupled to an end of the other of said pair of vessels and the other end of the conduit adapted to communicate with the volume of suspension in the reservoir, whereby the suspension entering the other vessel from said one vessel through the aperture drains into the reservoir by means of said conduit.

5. The continuous flow structure as defined in claim 4 wherein said control means further comprises: overflow means adjacent the upper end of said one vessel, and said one vessel has its upper end open to the atmosphere.

6. A continuous flow particle measuring apparatus which comprises: a duct having a wall at least a portion of which is of insulating material, a microscopic passageway in said wall portion of said duct, a flow-through chamber formed around said passageway on the exterior of the duct and connected to the duct, said duct extending through said flow-through vessel, electrodes in said chamber and said duct, said chamber adapted to have a source of continuously flowing suspension of particles suspended therein coupled thereto, means for producing a pressure differential on opposite ends of the passageway to cause a continuous flow of a portion of said suspension through said passageway from said chamber into said duct, vacuum means coupled to one end of said duct, suspension withdrawal means defined by the other end of said duct, said vacuum means maintaining the level of suspension in said duct sufficient for immersion of the passageway and its electrode, yet insufficient for withdrawal of the suspension via said vacuum means, a source of electric current connected to said electrodes, and means for connecting said electrodes to a detector.

7. A continuous flow particle measuring apparatus as defined in claim 6 wherein said withdrawal means further comprises: a reservoir suitable for containing a volume of suspension, said reservoir having a drain adjacent its upper end, and a conduit having one end coupled to said other end of said duct and the other end of said conduit adapted to communicate with the volume of suspension in the reservoir, whereby the suspension entering the duct from the chamber through the passageway drains into the reservoir through said conduit.

8. A continuous flow particle measuring apparatus which comprises: a duct having a wall of at least a portion of which is of insulating material, a microscopic passageway in said wall portion of said duct, a flow-through chamber formed around said passageway on the exterior of the duct and connected to the duct, said duct extending through said flow-through chamber, electrodes in said chamber and duct, said flow-through chamber adapted to have a source of continuously flowing suspension connected thereto, vacuum means coupled to said duct for maintaining a level of suspension within said duct to immerse said passageway and said electrode in the duct, yet insufficient for removing suspension from the duct, a reservoir suitable for containing a volume of suspension, said reservoir having a drain adjacent its upper end, and a conduit having one end coupled to an end of the duct and the other end of the conduit adapted to communicate with the volume of suspension in the reservoir, said reservoir and drain producing a pressure differential on opposite ends of the microscopic passageway to cause continuous flow of a portion of the suspension through the passageway.

References Cited

UNITED STATES PATENTS

| | | | |
|---|---|---|---|
| 2,656,508 | 10/1953 | Coulter | 324—71 |
| 2,869,078 | 1/1959 | Coulter et al. | 324—71 |
| 3,165,693 | 1/1965 | Isreeli et al. | 324—71 |
| 3,295,059 | 12/1966 | Coulter et al. | 324—71 |
| 1,743,966 | 1/1930 | Goudard | 137—576 XR |
| 3,299,354 | 1/1967 | Hogg | 324—71 |

OTHER REFERENCES

Berg, "Electronic Size Analysis," ASTM Special Technical Publication No. 254, published by ASTM, pp. 245–258.

EDWARD E. KUBASIEWICZ, Primary Examiner

U.S. Cl. X.R.

137—576

PO-1050
(5/69)

UNITED STATES PATENT OFFICE
CERTIFICATE OF CORRECTION

Patent No. 3,502,972                           Dated   April 24, 1970

Inventor(s)  Robert H. Berg

It is certified that error appears in the above-identified patent and that said Letters Patent are hereby corrected as shown below:

Column 1, line 6, after "60126" insert --prosecuted under rule 47(b) by petitioner Coulter Electronics, Inc., Hialeah, Florida, a corporation of Illinois--. Column 4, line 49, change "ino" to --into--.

Signed and sealed this 18th day of April 1972.

(SEAL)
Attest:

EDWARD M. FLETCHER, JR.                ROBERT GOTTSCHALK
Attesting Officer                      Commissioner of Patents